Feb. 24, 1970     F. J. KURTZ ET AL     3,496,634
METHOD OF WIRING AND METAL EMBEDDING AN ELECTRICAL BACK PANEL
Filed Dec. 30, 1966
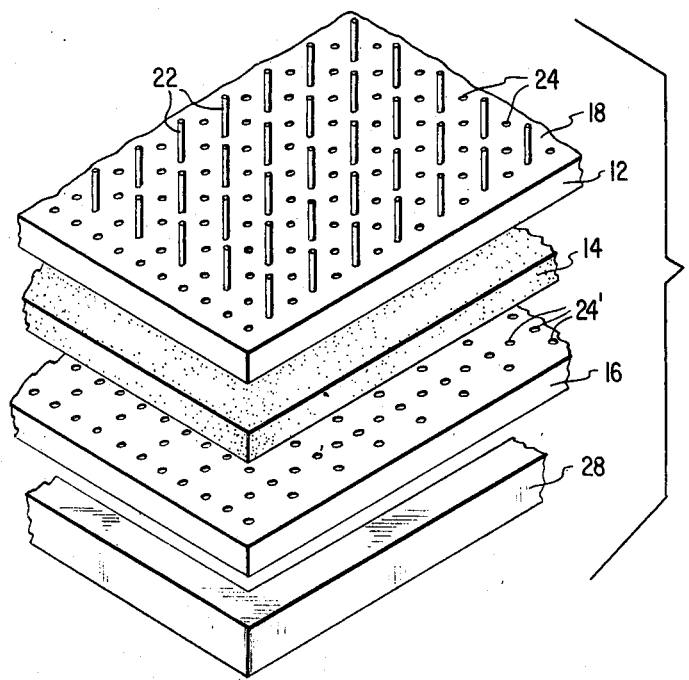
FIG. 1
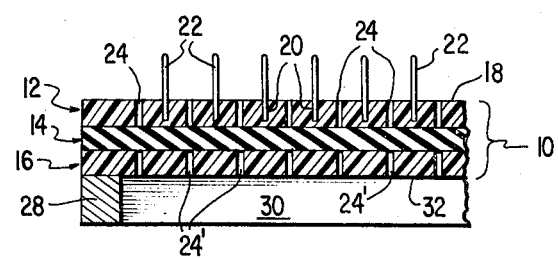
FIG. 3            FIG. 2
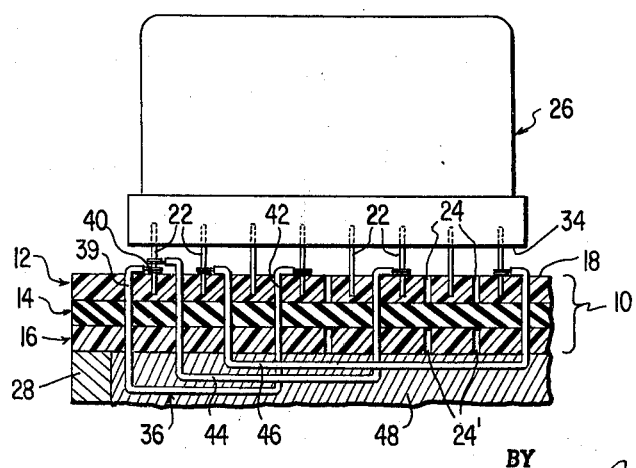
INVENTORS.
FRANK J. KURTZ
JOSEPH C. LOGUE
BY
*Sughrue, Rothwell, Mion, Zinn & Macpeak*
ATTORNEYS.

United States Patent Office 3,496,634
Patented Feb. 24, 1970

---

3,496,634
METHOD OF WIRING AND METAL EMBEDDING AN ELECTRICAL BACK PANEL
Frank J. Kurtz, Esopus, and Joseph C. Logue, Poughkeepsie, N.Y., assignors to International Business Machines Corporation, Armonk, N.Y., a corporation of New York
Filed Dec. 30, 1966, Ser. No. 606,099
Int. Cl. H01b 13/00
U.S. Cl. 29—624
3 Claims

ABSTRACT OF THE DISCLOSURE

A back panel which includes a sheet of imperforate, resilient material has the terminal ends of the insulated wire pass through the imperforate sheet prior to being stripped and coupled to panel conductive pins. A mass of molten metal is applied to the side of the panel carrying the insulated interconnecting wire portions and cooled to embed the insulated wire portions in a solid metal mass.

---

This invention relates to an improved back wired panel and additionally to a method by which standard wiring may be made coaxial.

Digital computers involve physically supporting a great number of electronic components on common panel members and interconnecting the same with electrical conductors. The conductors conventionally are of the insulated type to prevent shorting between adjacent connectors along the back of the panel. Since the insulated wires are in close proximity to each other, inductance effects between wires provide circuit problems. It is necessary to provide a conductive outer coating or shield on the wiring to eliminate such inductive effects. Conventional coaxial wires of small diameter are prohibitively expensive. Further, the coax-wires which pass through the panel must be physically supported by the panel and electrically connected to the electrical components carried thereby. It is necessary, therefore, not only to remove the insulation covering the terminal ends of conventional coax wires, but also the metal covering the insulation. This further increases the expense and time necessary in making of the appropriate electrical connections.

It is, therefore, a primary object of this invention to provide an improved back panel which inherently acts to support the component interconnecting wires, while at the same time sealing the component carrying surface of the panel from the back surface of the panel supporting the interconnecting wires.

It is a further object of this invention to provide an improved method of back panel wiring which allows the portions of the wires carried on the back panel to be shielded or coaxed in a simple one-step operation.

It is a further object of this invention to provide an improved shielding method for the back panel wiring in which a unitary metal mass not only acts as a coax or shield but also provides homogeneous grounding.

It is a further object of this invention to provide an improved method for shielding standard wire carried by a component supporting panel which does not adversely affect the insulation covering the wire, does not limit the size of the panel or board which may be wired, and which readily allows wire changing after initial shielding.

It is a further object of this invention to provide an improved method of shielding standard back panel wiring in which the shielding method does not affect the method of wiring wrapping terminals carried on the front of the panel.

Other objects of this invention will be pointed out in the following detailed description and claims and illustrated in the accompanying drawing which discloses, by way of example, the principle of this invention and the best mode which has been contemplated of applying that principle.

In the drawing:

FIGURE 1 is a perspective, exploded view of a component supporting panel which is back-wired and shielded by the method of the present invention;

FIGURE 2 is an elevational view, in section, of a portion of the panel of FIGURE 1 prior to back-wiring and shielding; and FIGURE 3 is the same view as FIGURE 2 of the panel after back-wiring and shielding.

In general, the invention is directed to an improved, laminated back panel for supporting electrical components being interconnected by wires passing through the panel and extending along the back thereof. The laminate comprises a central, imperforate, resilient sheet, sandwiched between sheets of insulative material carrying aligned through holes, whereby the terminal ends of an interconnecting wire are passed through the aligned holes and pierce the imperforate resilient sheet with the resilient sheet then effecting a seal about the outer surface of the wire while frictionally maintaining the interconnecting wires in position.

The invention is further directed to a method of electrically shielding the insulated wires carried by an electrical panel which involves the steps of applying a mass of molten metal to the side of the panel carrying the insulated wires and cooling the molten mass to embed the wires in solid metal.

In one specific form, for a laminated panel including an imperforate resilient sheet sandwiched between sheets of insulative material carrying aligned through holes, prior to applying the mass of molten metal, the interconnecting insulated wires have their ends inserted into spaced through holes carried by one of the insulated sheets. The wires pierce the resilient sheet and pass out of the aligned through holes carried by the other insulative sheet, whereupon the ends of the wires may be bared and connected to terminals carried by the panel adjacent the respective through holes. The resilient intermediate sheet shields the component side of the panel from the molten metal mass as it is applied to the back side of the panel for electrical shielding purposes.

Referring to the drawing, there is shown the improved back panel of the present invention, identified generally at 10, which basically comprises an outer first sheet or board member 12 formed of plastic or similar insulative material, a central sheet of silicon rubber 14 and a second or rear insulative board or sheet 6. The outer board is first drilled with blind holes 20 on 100-mil centers, for instance, from the outer surface 18 inwardly. Conductive metal pins 22 are inserted in the blind holes and extend perpendicular to surface 18, as indicated best in FIGURE 2. Four or more through holes 24 are drilled around each pin, the holes acting as wire entrance holes. It is further noted that the bottom sheet of plastic 16 is also provided with a like number of through holes 24'. When the three sheets 12, 14 and 16 are sandwiched together, holes 24' match the wire entrance holes 24 carried by the upper sheet 12. The intermediate sheet of imperforate silicon rubber 14 is attached to the underside of the first plastic board 12 and the second plastic board 16 is placed on the rubber sheet 14 to form a plastic board-rubber sheet-plastic board laminate structure 10.

The next step is the attachment of an open rectangular frame 28 to the periphery of the laminate structure 10 such that the rectangular frame 28 forms a well or void area 30, on the back side of the panel, as further defined by the bottom surface 32 of the lower board 16. The upstanding pins 22 are provided for physically supporting electronic components, such as component 26 in FIGURE 3, normally spaced slightly from the outer surface 18 of plastic board 12. In addition, the pins make appropriate electrical connections to component circuitry (not shown) internally of the component.

Appropriate electrical interconnections are made between the spaced insulated pins 22 in the manner shown in FIGURE 3. Interconnections are made by inserting a probe, such as a sewing needle (not shown), on the back side of the panel assembly, through one of the holes 24' carried by board member 16 of the laminate structure. The needle pierces the imperforate rubber sheet 14 and passes next through an aligned hole 24 carried by the upper panel board 12. For instance, end 38 of wire 36 is fed through associated, aligned holes 24' and 24 by the sewing needle with the left-hand end of the wire 38 protruding above the upper surface 18 of the panel assembly.

The panel or component receiving board of the present invention, which comprises a laminate structure involving at least one predilled sheet of insulative material and an imperforate sheet of resilient material overlying the drilled insulative sheet and covering the through holes, acts advantageously both to seal the nonused through holes, as well as to seal any conductor which passes through the through holes and pierces the imperforate, resilient layer. Further, in piercing the resilient layer, the resilient material closely hugs the conductor and frictionally maintains the inserted conductor in place, even though the conductor may be of a somewhat smaller diameter than the through hole. Obviously, were it not for the imperforate resilient material, the conductor may have a tendency to move from its prearranged position, prior to wire wrapping or other mode of connection to the adjacent terminal pins 22. This is especially so where the panel is being used as shown, with the interconnecting wires positioned on the bottom side of the panel and the components 26 on the top side.

After stripping the insulation, the bared wire end 40 is wrapped about a nearby pin 22 in conventional fashion. The same procedure is repeated with the right-hand end 42 of wire 36 so that the wire now interconnects the first and fourth pins from the left, as shown in FIGURE 3. Other interconnections involving, for instance, wires 44 and 46, are made in a similar manner.

With the interconnections completed, the intermediate, insulated portions of the wire extend across the back or rear side of the panel assembly within the well area 30 formed by the rectangular frame 28. The final step involves the filling of the well 30 with a low-melting temperature metal so as to perform the dual function of grounding the system and electrically shielding the wires from each other. For instance, after wiring, the frame 28 may be inverted and a low-melting temperature metal, in liquid form, is poured into the well 30, filling the same. Upon subsequent cooling, the well area 30 will be completely filled or potted with a unitary mass of low temperature metal 48. The metal 48 may comprise a low-melting temperature material, for instance, alloys of bismuth with metals such as tin, lead, cadmium or indium.

After completion of the shielding by the potting operation, one or more electronic components 26 may be mechanically coupled to the ends of the pins as shown in FIGURE 3. The pins act to make appropriate internal electrical connections within the component shell. Each component has its bottom surface 34 drilled to provide a like number of pin-receiving apertures (not shown) having the same spacing as the pins carried by the upper board 18.

With the wires applied to the panel board in this manner, the terminal ends protrude through the board laminate structure while intermediate insulated portions are immersed in a mass of low-melting temperature metal.

This not only provides a homogeneous grounding system, but ensures maximum length of coax wire to improve computer performance. The mass of metal 48 also protects the wiring from physical damage since none of the wiring is exposed. All portions of wires which are exposed on the back surface of the panel assembly are readily shielded. The method of shielding may be applied to any size board.

While the stripped ends of the wire which protrude outwardly from the upper surface 18 of the panel board assembly are shown connected to the adjacent pin by conventional wire wrapping techniques, it is obvious that other techniques, such as soldering may be readily employed.

To make a wiring change, it is only necessary to melt the low temperature metal 48 and pour out the metal carried by the well 30. Any wires which may have to be removed, may be readily pulled from the through holes 24 and 24' after disconnecting the stripped terminal ends from associated pins. Further, in case the removed wires are not replaced, the wire entrance holes that had wires taken out will automatically be sealed by the resilient rubber sheet which retracts about the area of penetration and seals the vacant hole. After rewiring, the well 30 is refilled with liquid metal and then, after solidification, the rewired board is now completed. The rubber sheet 14, even where perforated, acts to completely seal the back panel surface 32 from front surface 18. There is no possibility of liquid potting metal passing through those through holes carrying conductors since the resilient rubber sheet will closely hug the conductors after insertion. The low-melting temperature metal used as the potting material further has no dilatorious effect on the rubber even if a small amount penetrates a nonused through hole 24'.

From the above, it is seen that the method of the present invention advantageously provides the required metallic shielding of a high wire density computer panel board at minimum expense. The advantages of the present invention are quite obvious when this method is compared to the employment of small gage, commercial coax cable which is not only highly expensive, but is extremely difficult to work with.

While the invention has been particularly shown and described with reference to a preferred embodiment, it will be understood by those skilled in the art that the foregoing and other changes in the form and details may be made therein without departing from the spirit and scope of the invention.

What is claimed is:

1. The method of forming a laminated circuit connection panel, back wiring the same and metal shielding the insulated interconnection wires comprising the steps of: drilling a first insulative sheet with blind holes, forming a plurality of through holes around each blind hole, positioning a conductive metal pin in said blind holes so as to project outwardly from the surface of first insulative sheet, placing a sheet of silicon rubber under said pin-studded first sheet, positioning a second sheet of insulative material, carrying through holes identical in configuration and spacing to the through holes of said first sheet, on said rubber sheet to form said laminate panel, inserting probes carrying the terminal ends of each insulated wire through associated through holes of said third sheet, piercing said intermediate silicon rubber sheet and passing the terminal ends through an aligned through hole carried by said first sheet, stripping the insulation from the ends of each interconnecting wire and wrapping said bared wire ends to associated pins adjacent the through holes, and applying a mass of molten metal to the side of said laminate panel not carrying said pins and cooling the same to embed the intermediate insulated wire portions of each wire in a solid metal mass.

2. A method of making back panel wiring interconnections to conductor pins carried by one surface of a panel which includes a sheet of imperforate, resilient material and electrically shielding insulated wire portions carried on the other surface of said panel, said method comprising the steps of: passing the terminal ends of such insulated wires through said panel at spaced locations toward the same panel side as said pins, including piercing said resilient sheet with said wire terminal ends during passage through said panel, stripping the insulation from the ends of said wires and electrically connecting the bared wire ends to respective pins, applying a mass of molten metal to the side of said panel carrying said insulated interconnecting wire portions and cooling the same to imbed the insulated wire portions in the solid metal mass with said resilient sheet effectively sealing the wires and the panel to prevent the shielding metal from passing to the side of the panel carrying said conductive pins.

3. A method of making back panel wiring interconnections to conductor pins carried by one surface of said panel and electrically shielding insulated wire portions carried on the other surface thereof, said panel comprising a laminated structure including a central imperforate sheet of resilient material sandwiched between two insulated sheets having aligned through-holes offset from said conductive pins, said method comprising the steps of: passing the terminal ends of said insulated wire through said aligned holes and piercing said inner, imperforate, resilient sheet to frictionally hold and seal the same, stripping the insulation from the ends of said wires and electrically connecting the bared ends thereof to said pins, applying a mass of molten metal to the side of said panel carrying said insulated interconnecting wire portions and cooling the same to imbed the insulated wire portions in a solid metal mass.

References Cited

UNITED STATES PATENTS

| | | | |
|---|---|---|---|
| 1,200,352 | 10/1916 | Hadaway | 338—243 XR |
| 1,218,465 | 3/1916 | Reichold | 164—98 XR |
| 2,397,568 | 3/1946 | Seaman | 338—245 |
| 2,887,764 | 5/1959 | Knoll | 29—597 |

JOHN F. CAMPBELL, Primary Examiner

R. W. CHURCH, Assistant Examiner

U.S. Cl. X.R.

29—527, 611, 627, 628; 164—91, 98, 112; 174—68.5; 317—100, 101; 339—17